United States Patent Office 3,172,868
Patented Mar. 9, 1965

3,172,868
PROCESS FOR FORMING A 2-HYDROXYETHYL METHACRYLATE FOAM
Donald E. Jefferson, Greenbelt, Md., assignor to W. R. Grace & Co., a corporation of Connecticut
No Drawing. Filed Oct. 1, 1962, Ser. No. 227,553
13 Claims. (Cl. 260—2.5)

This invention relates to foamed polymer products from monomers and a process therefor. More particularly this invention is concerned with forming foamed thermoset polymeric and copolymeric products in situ from 2-hydroxyethyl methacrylate monomer.

Summarily the invention comprises polymerizing 2-hydroxyethyl methacrylate, preferably but not necessarily in a substantially closed system under substantially ambient conditions, in the presence of an aluminum alkyl compound of the formula

wherein R is hydrogen or an alkyl and R' is an alkyl, all of said alkyl groups containing 1 to 8 carbon atoms, and thereafter releasing some or all of the autogenous reaction pressure from the system to allow the polymerized material to expand into a foamed cellular structure.

The aluminum alkyl compound may also be added as a mixture to initiate polymerization in the present invention. The aluminum alkyl compound can be admixed with esters of acrylic acids, such as methyl, ethyl, n-butyl, 2-ethylhexyl acrylate and the like. The mixture is formed by admixing under ambient conditions the aluminum compound with an ester of an acrylic acid, e.g. butyl acrylate, in a mole ratio of 1:0.5 to 2.0 respectively, preferably 1:1. The use of the aluminum alkyl compound as a mixture decreases the exotherm of the reaction and allows for better temperature control and greater safety in handling.

The amount of aluminum alkyl compound used as an initiator in this invention is not critical and may be varied considerably. Relatively small amounts are operable to form relatively large amounts of polymer or copolymer. In general, a practical mole ratio of aluminum alkyl compound: 2-hydroxyethyl methacrylate monomer or co-monomers is 1:2–100 preferably 1:5–50 respectively. Even larger amounts of aluminum alkyl compounds are operable but unnecessary. Examples of some operable aluminum alkyl compounds include but are not limited to triethyl aluminum, triisobutyl aluminum, trioctyl aluminum, diisobutyl aluminum hydride, diethyl aluminum hydride, all either per se or admixed with the aforementioned esters of acrylic acids.

It should be understood that fillers, pigments, plasticizers and thickeners such as preformed polymers and the like can be added to the monomer mixture prior to forming foamed products in a total amount up to 50% by weight of the total composition within the scope of this invention. The function of such additives is to vary the density and flexibility of the foamed product. Examples of fillers employed, include but are not limited to, kaoline clay, calcium carbonate, polymethyl methacrylate, carbon black, metallic oxides, metallic powder, silica, talcum powder and the like.

The reaction is ordinarily initiated at room temperature i.e. 25° C. and atmospheric pressure i.e. ambient conditions. Higher or lower temperatures are operable but not necessary. The reaction is autogenous and exothermic. When the reaction is performed in a closed system, pressure from the reaction is released either continuously or intermittently to allow the polymer to expand into a foamed cellular structure. The control of the reaction by regulating the reaction pressure is also one method of varying the density of the polymer. It has been found that if the reaction pressure is not reduced by venting, the foamed polymer will not expand to its optimum volume and the density of the product is too high to afford good flexibility to the polymer. Thus the invention, although operable in an open system as will be shown hereinafter, is preferably carried out in a closed system with a pressure control vent to facilitate control of the density of the foamed product.

By the practice of this invention it is also possible to form foamed copolymers containing 2-hydroxethyl methacrylate. It has been found that to obtain a substantially uniform cell structure in a copolymer product, at least 50% by weight of the monomer reactants must be 2-droxyethyl methacrylate. If less than 50% by weight 2-hydroxyethyl methacrylate is used, the resulting product does not foam uniformly. Monomers capable of copolymerizing into foamed products with 2-hydroxyethyl methacrylate include esters of α-alkyl acryclic acid. Such monomers include but are not limited to methyl methacrylate, ethylmethacrylate, n-butyl acrylate, hexyl methacrylate, decyl octyl methacrylate and the like.

The density of the foamed homopolymer of 2-hydroxyethyl methacrylate can vary between about 12 and 25 lbs./ft.$^3$. Less dense or more dense materials can be formed upon the proper addition of plasticizers, other monomers, prepolymers, fillers, etc. The density of the foamed products of the instant invention were determined by weighing a measured cube sample.

The size of the cell structure is herein determined as small i.e. 0.1 cm. or less; medium i.e. 0.1–0.3 cm. and large as being 0.3 or greater in diameter.

The following examples will aid in understanding, but will expressly not limit the invention. Unless otherwise specified, all parts and percentages are by weight.

EXAMPLE 1

5.0 gm. 2-hydroxyethyl methacrylate, i.e.,

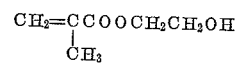

where charged to a rubber stoppered test tube by hypodermic syringe. 0.5 cc. of a 1:1 mole ratio diisobutyl aluminum hydride/n-butyl acrylate mixture containing 0.2275 gm. diisobutyl aluminum hydride was added by hypodermic syringe to the test tube through the rubber stopper. After about two minutes, the viscosity of the tube contents increased, bubble formation was noted and the material began to expand. As pressure was bled off through the rubber stopper, the material expanded more rapidly. The reaction of about 5 minute duration was exothermic. The closed cell foamed product was soft and flexible. The foamed product had a volume equal to 5 times its original volume, a medium size cell structure and a density of 17.6 lbs./ft.$^3$.

EXAMPLE 2

Example 1 was repeated except that the test tube was unstoppered and open to the atmosphere. The foamed cellular product increased about 3 times its original volume and had a density of about 24 lbs./ft.$^3$. The product was flexible and of medium cell size.

EXAMPLE 3

Example 1 was repeated except that the initiator was 0.20 gm. diisobutyl aluminum hydride per se. The foamed cellular product was soft and flexible, had a medium size cell structure and had a density of less than 15.0 lbs./ft.$^3$.

The following examples show the ability of forming foamed copolymers containing 2-hydroxyethyl methacrylate by the instant invention.

EXAMPLE 4

4.8 gm. of 2-hydroxyethyl methacrylate monomer and 0.469 gm. of methyl methacrylate monomer were charged to a rubber-stoppered test tube. 0.5 cc. of a 1:1 mole ratio diisobutyl aluminum hydride:butyl acrylate mixture containing 0.21 gm. diisobutyl hydride were added to the test tube by hypodermic syringe. After about 3 minutes a foamed cellular product 4 times its original volume having a density of 16.5 lbs./ft.$^3$ was formed. The foamed product was tough and flexible and of medium size cell structure.

EXAMPLE 5

Example 4 was repeated except that 0.9 gm. of methyl methacrylate were added. The foamed cellular product was 4 times its original volume and had a density of 14.3 lbs./ft.$^3$. The foamed product was hard and nonflexible.

The following examples in Table I show the variation in properties obtained by adding fillers or changing the aluminum alkyl compound:monomer mole ratio. The examples in Table I were performed by adding the monomer, and any filler used, to a rubber-stoppered test tube and thereafter by hypodermic syringe adding the aluminum alkyl compound initiator at ambient conditions. The reaction pressure was vented intermittently during the 5 minute reaction.

*Table I*

| Example No. | 6 | 7 | 8 | 9 | 10 |
|---|---|---|---|---|---|
| 2-hydroxyethyl methacrylate (gms.) | 5.04 | 5.06 | 5.03 | 5.04 | 5.04. |
| Diisobutyl aluminum hydride$^a$ (gms.) | 0.23 | 0.46 | 0.23 | 0.23 | 0.23. |
| Filler (gms.) | 0 | 0 | 4.50$^b$ | 2.18$^c$ | 1.78$^d$. |
| Initial Reaction Temp. (° C) | 23 | 23 | 23 | 23 | 23. |
| Initial Reaction Pressure (p.s.i.) | 14.7 | 14.7 | 14.7 | 14.7 | 14.7. |
| Density of Foamed Product (lbs./ft.$^3$) | 17.8 | 12.8 | 38.8 | 13.4 | 27.7. |
| Volume of Foamed Product/Original Volume | 5 | 7 | 2 | 7 | 4. |
| Remarks$^e$ | Flexible, medium size cell structure. | Flexible, medium size cell structure. | Small cell structure, flexible. | Very hard and nonflexible. | Very soft and elastic, good rebound. |

$^a$Diisobutyl aluminum hydride admixed with butyl acrylate in a 1:1 mole ratio.
$^b$Ferric oxide (paint grade).
$^c$Zinc oxide (paint grade).
$^d$Kaolin clay.
$^e$Size of cell structure: Small 0.1 cm. or less; medium 0.1–0.3 cm.; large 0.3 or greater in diameter.

Thus from Table I it is seen that the density, flexibility and cell size of the foamed products can be varied within wide limits by varying the fillers added to the reaction mixture. Additionally the density of the foamed product can be varied by changing the initiator:monomer mole ratio. In general, as can be seen by comparing Examples 6 and 7, the lower the aluminum alkyl compound initiator:monomer ratio the lower the density of the resulting foamed product.

The foamed products of the instant invention containing 2-hydroxyethyl methacrylate have many and varied uses. The flexible foamed homopolymer of 2-hydroxyethyl methacrylate can be used as sponges, cushions and various other padding material. The more rigid copolymers of 2-hydroxyethyl methacrylate can be used as insulation and as packing material. The filled foamed polymer products containing 2-hydroxyethyl methacrylate can be used as sponges, padding insulation or packaging material depending on the filler employed.

I claim:

1. A process for forming a foamed thermoset polymer of 2-hydroxyethyl methacrylate which comprises subjecting 2-hydroxyethyl methacrylate monomer under ambient conditions to the action of an aluminum alkyl compound of the formula,

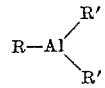

wherein R is a member of the group consisting of hydrogen and an alkyl and R' is an alkyl, all of said alkyl groups containing 1 to 8 carbon atoms.

2. The process according to claim 1 wherein the mole ratio of the aluminum alkyl compound to 2-hydroxyethyl methacrylate monomer is in the range 1:2 to 100 respectively.

3. The process according to claim 1 wherein the aluminum alkyl compound is admixed with an ester of an acrylic acid in a mole ratio in the range 1:0.5 to 2.0 respectively at ambient conditions.

4. The process according to claim 3 wherein the ester of an acrylic acid is n-butyl acrylate.

5. The process according to claim 1 wherein the reaction is performed in a closed system.

6. The process according to claim 5 wherein pressure is vented from the closed system during the reaction.

7. The process for forming a foamed thermoset copolymer of 2-hydroxyethyl methacrylate and an ester of an α-alkyl acrylic acid which comprises forming a mixture of said ester with at least 50% by weight of said mixture of 2-hydroxyethyl methacrylate and subjecting said mixture under ambient conditions to the action of an aluminum alkyl compound of the formula,

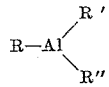

wherein R is a member of the group consisting of hydrogen and an alkyl and R' is an alkyl, all of said alkyls containing 1 to 8 carbon atoms.

8. The process according to claim 7 wherein the mole ratio of the aluminum alkyl compound to the monomer mixture is in the range 1:2 to 100 respectively.

9. The process according to claim 7 wherein the ester of an α-alkyl acrylic acid is methyl methacrylate.

10. The process according to claim 7 wherein the aluminum alkyl compound is admixed with an ester of an acrylic acid in a mole ratio in the range 1:0.5 to 2.0 respectively at ambient conditions.

11. The process according to claim 10 wherein the ester of acrylic acid is n-butyl acrylate.

12. The process according to claim 7 wherein the reaction is performed in a closed system.

13. The process according to claim 12 wherein pressure is vented from the closed system during the reaction.

References Cited by the Examiner

UNITED STATES PATENTS

| | | | |
|---|---|---|---|
| 2,621,161 | 12/52 | Kulp et. al. | 260—2.5 |
| 2,676,928 | 4/54 | Frank | 260—2.5 |
| 2,911,380 | 11/59 | Doedens | 260—2.5 |
| 2,966,471 | 12/60 | Anspon | 260—2.5 |
| 3,030,349 | 4/62 | Stickney et al. | 260—89.5 |
| 3,059,024 | 10/62 | Goldberg et al. | 260—86.1 |
| 3,069,403 | 12/62 | Propas | 260—89.5 |
| 3,094,513 | 6/63 | Kropa | 260—89.5 |
| 3,098,831 | 7/63 | Carr | 260—2.5 |

FOREIGN PATENTS

| | | |
|---|---|---|
| 859,297 | 1/61 | Great Britain. |
| 884,706 | 12/61 | Great Britain. |

MURRAY TILLMAN, *Primary Examiner.*

JAMES A. SEIDLECK, *Examiner.*

UNITED STATES PATENT OFFICE
CERTIFICATE OF CORRECTION

Patent No. 3,172,868                        March 9, 1965

Donald E. Jefferson

It is hereby certified that error appears in the above numbered patent requiring correction and that the said Letters Patent should read as corrected below.

Column 2, line 16, for "droxyethyl" read -- hydroxyethyl --.

Signed and sealed this 27th day of July 1965.

(SEAL)
Attest:

ERNEST W. SWIDER                        EDWARD J. BRENNER
Attesting Officer                         Commissioner of Patents